US012585808B2

(12) United States Patent          (10) Patent No.:     US 12,585,808 B2
Kishan et al.                          (45) Date of Patent:      Mar. 24, 2026

(54) SYSTEMS AND METHODS FOR CONTENT BASED ACCESS CONTROL

(71) Applicant: SAP SE, Walldorf (DE)

(72) Inventors: Gopi Kishan, Bangalore (IN); Rohit Jalagadugula, Visakhapatnam (IN)

(73) Assignee: SAP SE, Walldorf (DE)

( * ) Notice:    Subject to any disclaimer, the term of this patent is extended or adjusted under 35 U.S.C. 154(b) by 245 days.

(21) Appl. No.: 18/475,505

(22) Filed:    Sep. 27, 2023

(65)              Prior Publication Data

US 2025/0103741 A1      Mar. 27, 2025

(51) Int. Cl.
  *G06F 21/62*        (2013.01)
  *G06N 5/022*        (2023.01)
(52) U.S. Cl.
  CPC ......... *G06F 21/6218* (2013.01); *G06N 5/022* (2013.01)
(58) Field of Classification Search
  CPC ...... G06F 21/6218; G06F 21/62; G06N 5/022
  See application file for complete search history.

(56)              References Cited

U.S. PATENT DOCUMENTS

| 2013/0239172 A1* | 9/2013 | Murakami | .............. H04L 63/20 |
| | | | 726/1 |
| 2018/0285839 A1* | 10/2018 | Yang | ...................... G06Q 20/40 |
| 2020/0007554 A1* | 1/2020 | Vincent | ............... G06F 21/6218 |
| 2022/0291855 A1* | 9/2022 | Hasegawa | ............. G06F 16/185 |
| 2024/0256582 A1* | 8/2024 | Jain | ..................... G06F 16/3329 |

* cited by examiner

*Primary Examiner* — Quazi Farooqui
(74) *Attorney, Agent, or Firm* — Fountainhead Law Group, PC

(57)              ABSTRACT

Embodiments of the present disclosure include techniques for controlling access to electronic content. In one embodiment, a user generates content in an electronic document. The system retrieves the content and a profile for the user. A predictive engine determines an access control list comprising a plurality of entries based on the content and the profile. The access control list may be presented to the user, and the system receives a verification from the user of the plurality of entries in the access control list.

18 Claims, 4 Drawing Sheets

SYSTEMS AND METHODS FOR CONTENT BASED ACCESS CONTROL

BACKGROUND

The present disclosure relates generally to software system, and in particular, to systems and methods for content based access control.

Security in modern computer systems is a growing concern among organizations and individuals who increasingly rely on the integrity of their computer systems. One security measure is referred to access control. Access control is a data security process that enables organizations to manage who is authorized to access corporate data and resources. Secure access control uses policies that verify users are who they claim to be and ensures appropriate control access levels are granted to users. Typical forms of access control include discretionary access control (DAC), mandatory access control (MAC), role-based access control (RBAC), and rule-based access control (RuBAC).

An access control list (ACL) is made up of rules that either allow access to a computer environment or deny it. In a way, an access control list is like a guest list at an exclusive club. Only those on the list are allowed in the doors. For example, DAC lists (DACLs) may define a trustee whom access is allowed or denied (names of individuals or groups) access to a securable object. When a process tries to access a securable object, the system checks the entries in the object's DACL to determine whether to grant access to it.

Another example of access control is a system ACL (SACL). SACLs are used for establishing system-wide security policies for actions such as logging or auditing resource access. The SACL typically attached to a system, directory, or file object specifies which security principals (users, groups, computers) should be audited when accessing the object, which access events should be audited for these principals, and whether a Success or Failure attribute is generated for an access event, depending on the permissions granted in the DACL for the object, for example.

One common challenge with ACLs in general is that updating and maintaining the ACLs can be time consuming and labor intensive.

The present disclosure is directed to techniques for improving access control.

DETAILED DESCRIPTION

Described herein are techniques for content based access control. In the following description, for purposes of explanation, numerous examples and specific details are set forth in order to provide a thorough understanding of some embodiments. Various embodiments as defined by the claims may include some or all of the features in these examples alone or in combination with other features described below and may further include modifications and equivalents of the features and concepts described herein.

Figure 1:
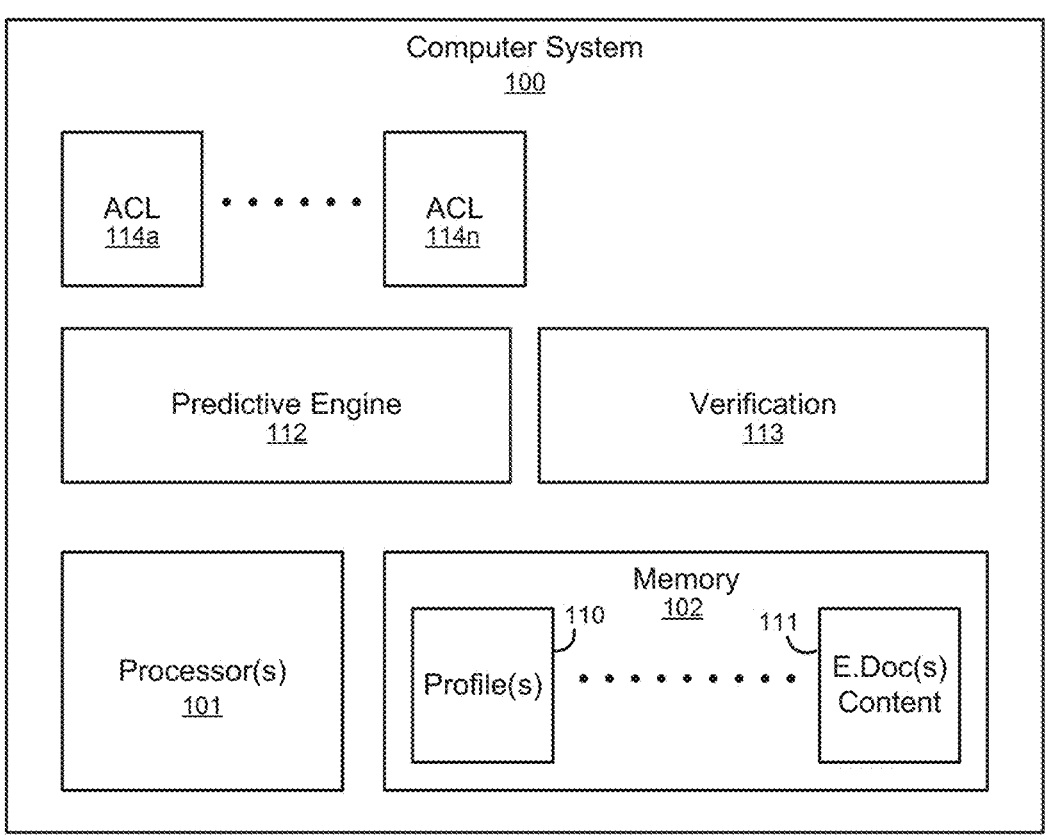
FIG. 1 illustrates a system for software system for content based access control according to an embodiment.

FIG. 1 illustrates a computer system 100 for performing data fixes according to an embodiment. Features and advantages of the present disclosure include dynamically generating access controls based on content of electronic assets. In the following disclosure this is referred to as content based access control. In the example shown in FIG. 1, a computer system 100, including one or more processors 101 and memory 102 (a non-transitory computer readable medium), may execute software comprising a predictive engine 112 and verification unit 113. Users may generate content in electronic documents (E.Doc(s) Content) 111, which may be stored in memory 102. In some example embodiments, the content comprises text data. Additionally, memory 102 may store profiles of users (e.g., names, working groups, managers, positions within a company, and the like). Features and advantages of the present disclosure include using the profiles 110 and content 111 to generate access controls. In one example embodiment, predictive engine 112 receives a profile for a user and electronic content, and determines (e.g., automatically) an access control list 114a, for example, comprising a plurality of entries based on the content and the profile. Predictive engine 112 may receive a plurality of profiles for a plurality of users and content in a plurality of electronic documents, and automatically generate ACLs 114a-n for the electronic documents across an organization, for example. In some embodiments, the ACLs are discretionary access control lists (DACLs).

In one example embodiment, when a user generates content in an electronic document, the predictive engine 112 generates an ACL to the user for verification. Verification unit 113 may receive a verification from the user of the plurality of entries in the access control list 114a, for example. Predictive engine 112 may analyze content in the electronic document and present the user with a predicted ACL 114a. The user may provide feedback to predictive engine 112 so that predictive engine 112 is trained to improve ACL predictions by users over time as content changes. Verification unit 113 may implement a reward models, based on feedback from user creating document, to train predictive engine 112 as follows: every wrong entry yields negative points, every right entry yields positive points, every missing entry yields negative points, and any entry that is unchanged by the user produces a cumulative score over a time period time.

Figure 2:
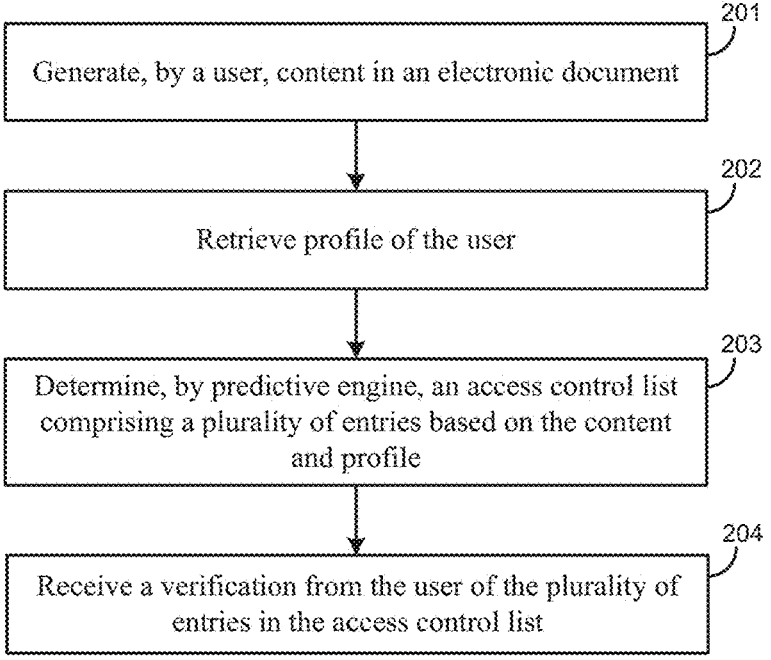
FIG. 2 illustrates a method for content based access control according to an embodiment.

FIG. 2 illustrates a method for content based access control according to an embodiment. Steps 201-204 illustrate a process for dynamic generation of ACLs. At 201, a user generates content in an electronic document. At 202, a profile of the user is retrieved (e.g., from a human resources (HR) software system, such as an HR profile from SUC-CESSFACTORS®). At 203, the profile and the content in the electronic document are input to a predictive engine, and the predictive engine determines an access control list based on the content and the profile. As described in more detail below, the ACL may be a DACL, for example, and the predictive engine may be a transformer model. The ACL may comprise a plurality of entries specifying individuals or groups, for example, that have access to the content in the electronic document. At 204, the computer system receives a verification from the user of the plurality of entries in the access control list. For example, a user may create or modify a document, and the content in the document is provided, with the user's profile, to a predictive engine. The predictive engine may be trained to generate ACLs from user profiles and content, for example. The predictive engine may receive the user's profile and the content in the electronic document (e.g., as numeric vectors) and output an ACL. In some embodiments, the user generating the content may be presented with the generated ACL and prompted to verify the entries. The user may provide feedback on the accuracy of the entries, where correct entries produce positive points, incorrect or missing entries produce negative points, and unchanged entries produce cumulative points over a time period to re-train the predictive engine, for example. Accordingly, certain embodiments may use reinforced learning with a "Human-In-Loop" to verify the generated ACLs and continuously improve ACL accuracy. Overtime, a trained system achieving accuracy above a threshold may generate ACLs without user verification, for example.

Figure 3:
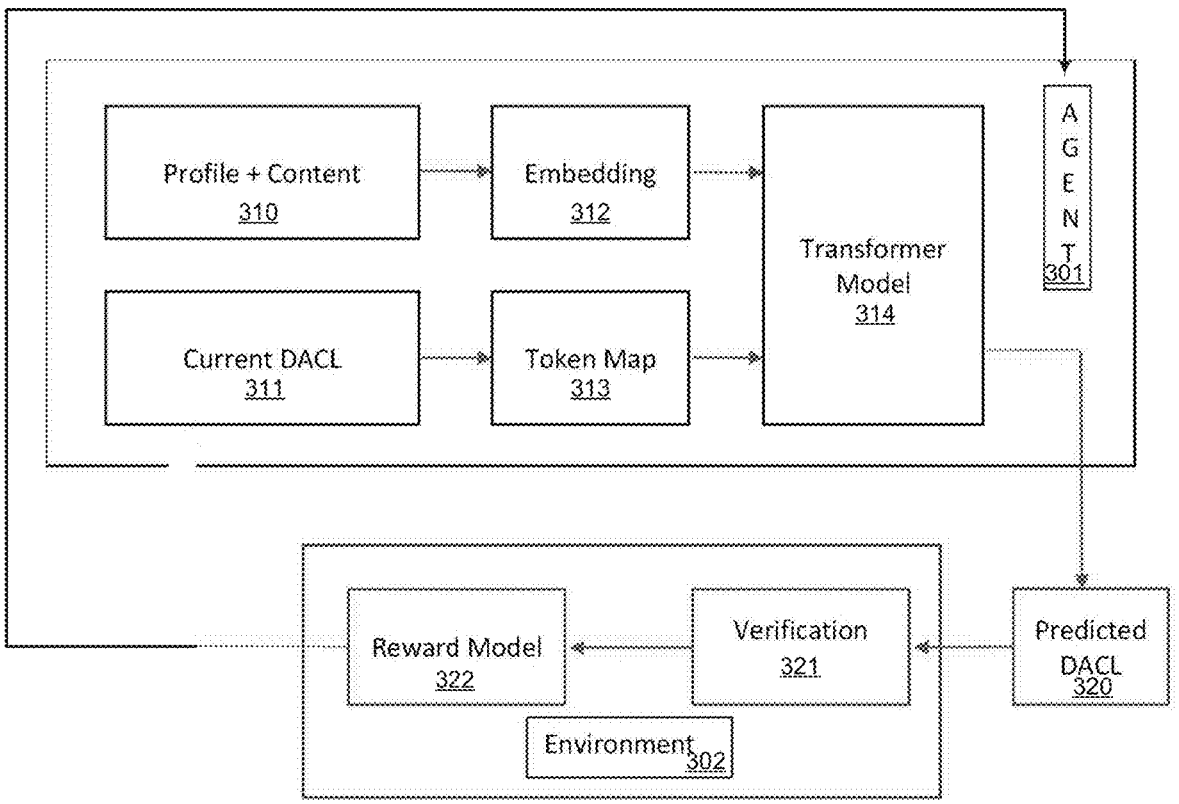
FIG. 3 illustrates an example software architecture for content based access control according to an embodiment.

FIG. 3 illustrates an example software architecture for content based access control according to an embodiment. The example in FIG. 3 illustrates a reinforced learning architecture including an agent 301 and an environment 302. Agent 301 includes profile and content retrieval software 310, access control list retrieval software 311 (e.g., current DACLs), embedding software 312, token mapping software 313, and a transformer model 314. Agent 301 receives system state and reward information and generates an action. State information may include current profiles, electronic document content state, and ACLs. Actions may include DACLs 320 generated by transformer model 314 to allow or deny access to a user or group, for example. Environment 302 includes verification software 321 and reward model software 322, as well as the users, reward models, files, and file system, for example. Rewards are based on verifications by users (e.g., correct or incorrect ACL entry predictions).

Initially, a large language model (LLM) may be trained on an initial corpus of profiles, content, and existing ACLs. The system may access data comprising user profiles, document content, file metadata (310), and access control lists (311), for example. The system may generate numerical vectors (312, 313) from the user profiles, the document content, the file metadata, and the access control lists and provide the numerical vectors for the user profiles, the document content, and the file metadata as an input embedding to transformer model 314. Similarly, the system may provide the numerical vectors for the access control lists as an output embedding to transformer model 314. Transformer model 314 produces output probabilities corresponding to generated access control lists. For instance, the profile and content are embedded at 312 in a first numeric vector, a first pre-existing access control list is token mapped at 313 into a second numeric vector, and the first numeric vector and second numeric vector are applied as inputs to transformer model 314 to generate an access control list.

Figure 4:
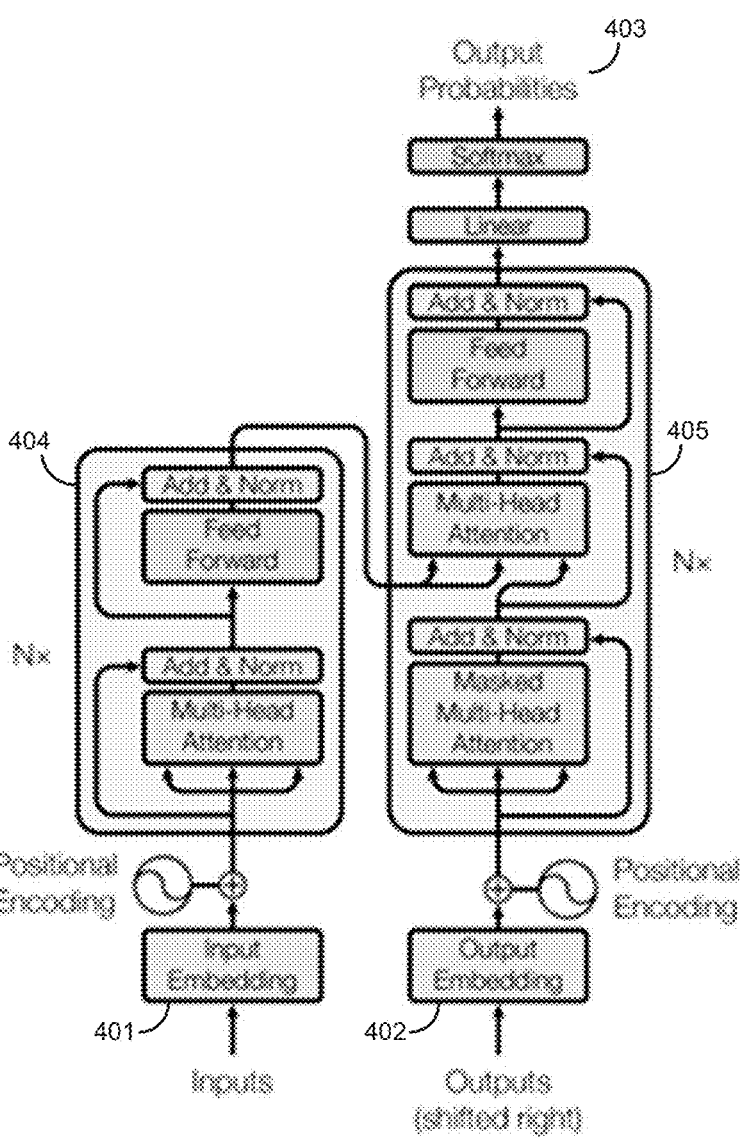
FIG. 4 illustrates an example transformer model used in various embodiments.

In this example, the predictive engine is a trained transformer model. An example transformer model is illustrated in FIG. 4. Transformer model inputs (e.g., profiles and content) and example outputs (e.g., existing ACLs). Particular profiles and content in each electronic document may have an associated ACL or DACL, for example. The profiles and content are embedded at 312 and 401. Embedding an input, such as text in an electronic document or profile, may include transforming the input into a numerical vector that the transformer model can process. Similarly, the output ACLs may be embedded at 402. One example of embedding is token mapping, where inputs are mapped to numeric vector tokens that the transformer model can process. Profile and content vectors are processed by transformer section 404, and ACL vectors are processed by transformer section 405 as shown. Section 404 output is coupled as an input to a multi-head attention layer in section 405 as shown.

Referring again to FIG. 3, transformer model 314 generates predicted ACLs (e.g., DACLs), which are received by verification software 321. Verification software 321 presents the predicted ACL to a user to verify the generated access control lists. Based on the verification, reward software 322 adjusts points to train the transformer model. The rewards and feedback are stored in agent 301 to further train the model, for example. A verified DACL may be reprocessed. Reprocessing the verified DACL makes the transformer model able to capture how much prediction has already been done and how different a previous predicted DACL is from the verified DACL. Accordingly, the trained transformer model is updated after the verification from the user.

An example process is as follows. For verification scheme and feedback loop, the Predictive Engine predicts the ACL entries, which may further be verified by Human-In-Loop (HIL). This HIL is the person who is owning the electronic document and providing inputs. If HIL decides to cross-check predictions, feedback is generated which is further send to predictive engine for further training. Feedback contains the evaluation of the predictions and provides score to each predicted entry based on Reward Model. For the reward model, the HIL may perform following action on a predicted ACL as verification over course of electronic document lifecycle.

1. HIL adds a new entry in the predicted ACL.
2. HIL deletes an entry in the predicted ACL.
3. HIL confirms an entry in the predicted ACL.
4. If an entry in the predicted ACL is untouched, it is not verified by HIL.

Based on above actions, following scores will be given to the predicted entry in the ACL.

1. score=$-r$
2. score=$-r$
3. score=$+r$
4. score=cumulative over time; e.g., $y^t r$, where t is time parameter and takes integer values from [1, 365] and $y=\frac{1}{2}$ (constant)

In above, r is a hyperparameter and denotes a rewards value. It is constant positive real number and can be chosen to be 1.0. Also, a positive score indicates desired behavior, and a negative score indicates an undesired behavior, with score magnitude being how strong this behavior be imposed on predictive engine. With this, let us understand the 4 scenarios how actions translate to rewards. Adding new entry implies the predictive engine missed this, so this behavior be suppressed by negative score. Hence in future, predictive engine should be predicting similar entry. Similar, deleting an entry implies wrong prediction. so, this behavior be suppressed by negative score. Hence in future, predictive engine should not be predicting similar entry. Confirming an entry implies correct prediction. So, this behavior be promoted by positive score. Hence in future, predictive engine should continue predicting similar entry. Unverified entries get a cumulative score over duration of time (e.g., 1 year). Time factor, t takes values from 1 to 365 gaining score as defined above each day. This cumulative score approximately sums to reward value, r. The idea is if an entry remains unchanged for long time, it was probably a correct entry. Hence, score at the end equals to verified score (of scenario 3). This entire schema is an example Reward Model, generating reward scores of ACL predictions.

As for Training Formulation, the task of our AI agent is to maximize its reward. So, it will predict ACL entries which should get net high reward score. The reward model imposed desired human behavior thus ensuring continuous improvement in prediction with help of HIL. Formally, MAXIMISE W {R}, where W=weights of Transformer Model and R=Total Reward received.

This means maximize the Total Reward by only changing W.

Further, R=ΣRewardModel (predicted ACL), where summation is for all documents.

Further, ACL is predicted by the transformer model which takes input previous ACL and (document+profile) embedding. The transformer model is parameterized by weights W which are trained finally to get better rewards, and in process better prediction.

Finally, we can write the optimization equation as, $$\text{MAXIMISE W } \{\Sigma \text{RewardModel (TRANSFORMER}\\ (d+\text{prev.ACL}))\}$$

where W=weights of Transformer Model and d=document+profile.

Figure 5:
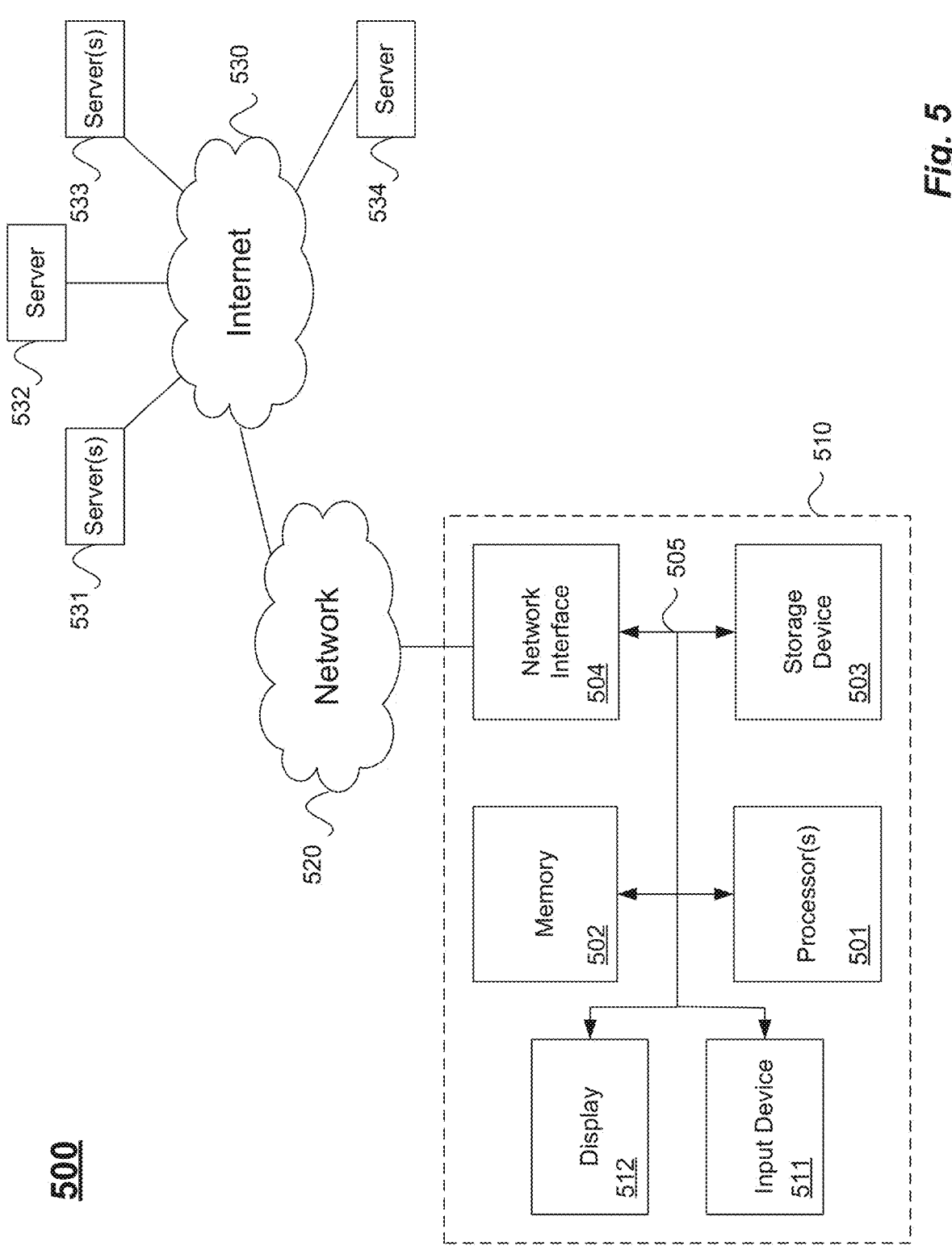
FIG. 5 illustrates hardware of a special purpose computing system configured according to the above disclosure.

FIG. 5 illustrates hardware of a special purpose computing system 500 configured according to the above disclosure. The following hardware description is merely one example. It is to be understood that a variety of computers topologies may be used to implement the above described techniques. An example computer system 510 is illustrated in FIG. 5. Computer system 510 includes a bus 505 or other communication mechanism for communicating information, and one or more processor(s) 501 coupled with bus 505 for processing information. Computer system 510 also includes memory 502 coupled to bus 505 for storing information and instructions to be executed by processor 501, including information and instructions for performing some of the techniques described above, for example. Memory 502 may also be used for storing programs executed by processor(s) 501. Possible implementations of memory 502 may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, solid state disk, a flash or other non-volatile memory, a USB memory card, or any other electronic storage medium from which a computer can read. Storage device 503 may include source code, binary code, or software files for performing the techniques above, for example. Storage device 503 and memory 502 are both examples of non-transitory computer readable storage mediums (aka, storage media).

In some systems, computer system 510 may be coupled via bus 505 to a display 512 for displaying information to a computer user. An input device 511 such as a keyboard, touchscreen, and/or mouse is coupled to bus 505 for communicating information and command selections from the user to processor 501. The combination of these components allows the user to communicate with the system. In some systems, bus 505 represents multiple specialized buses for coupling various components of the computer together, for example.

Computer system 510 also includes a network interface 504 coupled with bus 505. Network interface 504 may provide two-way data communication between computer system 510 and a local network 520. Network 520 may represent one or multiple networking technologies, such as Ethernet, local wireless networks (e.g., WiFi), or cellular networks, for example. The network interface 504 may be a wireless or wired connection, for example. Computer system 510 can send and receive information through the network interface 504 across a wired or wireless local area network, an Intranet, or a cellular network to the Internet 530, for example. In some embodiments, a front end (e.g., a browser), for example, may access data and features on backend software systems that may reside on multiple different hardware servers on-prem 531 or across the Internet 530 on servers 532-534. One or more of servers 532-534 may also reside in a cloud computing environment, for example.

FURTHER EXAMPLES

Each of the following non-limiting features in the following examples may stand on its own or may be combined in various permutations or combinations with one or more of the other features in the examples below. In various embodiments, the present disclosure may be implemented as a system, method, or computer readable medium.

In one embodiment, the present disclosure includes a computer system comprising: at least one processor; and at least one non-transitory computer readable medium storing computer executable instructions that, when executed by the at least one processor, cause the computer system to perform a method of controlling access to electronic content.

In one embodiment, the present disclosure includes a non-transitory computer-readable medium storing computer-executable instructions that, when executed by at least one processor, perform a method of controlling access to electronic content.

In one embodiment, the present disclosure includes a method of controlling access to electronic content.

The method may comprise generating, by a user, content in an electronic document; retrieving a profile for the user; determining, by a predictive engine, an access control list comprising a plurality of entries based on the content and the profile; and receiving a verification from the user of the plurality of entries in the access control list.

In one embodiment, the predictive engine comprises a trained transformer model, and wherein the trained transformer model is updated after the verification from the user.

In one embodiment, the profile and content are embedded in a first numeric vector, a first pre-existing access control list is token mapped into a second numeric vector, and wherein the first numeric vector and second numeric vector are applied as inputs to a transformer model to generate said access control list.

In one embodiment, the method further comprising modifying the predictive engine based on the verification from the user, wherein the predictive engine comprises a transformer model, and wherein: when the user indicates that an entry in the access control list is a wrong entry produces negative points; when the user indicates that an entry in the access control list is a correct entry produces positive points; when the user indicates a missing entry in the access control list produces negative points; and when an entry is unchanged by the user in the access control list produces a cumulative score over a time period time.

In one embodiment, the predictive engine comprises a transformer model, the method further comprising: accessing data comprising user profiles, document content, file metadata, and access control lists; generating numerical vectors from the user profiles, the document content, the file metadata, and the access control lists; providing the numerical vectors for the user profiles, the document content, and the file metadata as an input embedding to the transformer model, and providing the numerical vectors for the access control lists as an output embedding to the transformer model, to produce output probabilities corresponding to generated access control lists; and verifying the generated access control lists to train the transformer model.

In one embodiment, the content comprises text data.

In one embodiment, the access control list is a discretionary access control list (DACL).

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method of controlling access to electronic content comprising:

generating, by a user, content in an electronic document;

retrieving a profile for the user;

determining, by a predictive engine, an access control list comprising a plurality of entries based on the content and the profile, wherein the predictive engine comprises a trained transformer model with inputs of a first numeric vector mapping the profile and the content and a second numeric vector token mapping a first pre-existing access control list; and receiving a verification from the user of the plurality of entries in the access control list.

2. The method of claim 1, wherein the trained transformer model is updated after the verification from the user.

3. The method of claim 1, further comprising modifying the predictive engine based on the verification from the user, and wherein:

when the user indicates that an entry in the access control list is a wrong entry produces negative points;

when the user indicates that an entry in the access control list is a correct entry produces positive points;

when the user indicates a missing entry in the access control list produces negative points; and when an entry is unchanged by the user in the access control list produces a cumulative score over a time period time.

4. The method of claim 1, the method further comprising:

accessing data comprising user profiles, document content, file metadata, and access control lists;

generating numerical vectors from the user profiles, the document content, the file metadata, and the access control lists;

providing the numerical vectors for the user profiles, the document content, and the file metadata as an input embedding to the trained transformer model, and providing the numerical vectors for the access control lists as an output embedding to the trained transformer model, to produce output probabilities corresponding to generated access control lists; and verifying the generated access control lists to train the trained transformer model.

5. The method of claim 1, wherein the content comprises text data.

6. The method of claim 1, wherein the access control list is a discretionary access control list (DACL).

7. A computer system comprising:

at least one processor;

at least one non-transitory computer readable medium storing computer executable instructions that, when executed by the at least one processor, cause the computer system to perform a method of controlling access to electronic content comprising:

generating, by a user, content in an electronic document;

retrieving a profile for the user;

determining, by a predictive engine, an access control list comprising a plurality of entries based on the content and the profile, wherein the predictive engine comprises a trained transformer model with inputs of a first numeric vector mapping the profile and the content and a second numeric vector token mapping a first pre-existing access control list; and receiving a verification from the user of the plurality of entries in the access control list.

8. The computer system of claim 7, wherein the trained transformer model is updated after the verification from the user.

9. The computer system of claim 7, further comprising modifying the predictive engine based on the verification from the user, and wherein:

when the user indicates that an entry in the access control list is a wrong entry produces negative points;

when the user indicates that an entry in the access control list is a correct entry produces positive points;

when the user indicates a missing entry in the access control list produces negative points; and when an entry is unchanged by the user in the access control list produces a cumulative score over a time period time.

10. The computer system of claim 7, the method further comprising:

accessing data comprising user profiles, document content, file metadata, and access control lists;

generating numerical vectors from the user profiles, the document content, the file metadata, and the access control lists;

providing the numerical vectors for the user profiles, the document content, and the file metadata as an input embedding to the trained transformer model, and providing the numerical vectors for the access control lists as an output embedding to the trained transformer model, to produce output probabilities corresponding to generated access control lists; and verifying the generated access control lists to train the trained transformer model.

11. The computer system of claim 7, wherein the content comprises text data.

12. The computer system of claim 7, wherein the access control list is a discretionary access control list (DACL).

13. A non-transitory computer-readable medium storing computer-executable instructions that, when executed by at least one processor, perform a method of controlling access to electronic content, the method comprising:

generating, by a user, content in an electronic document;

retrieving a profile for the user;

determining, by a predictive engine, an access control list comprising a plurality of entries based on the content and the profile, wherein the predictive engine comprises a trained transformer model with inputs of a first numeric vector mapping the profile and the content and a second numeric vector token mapping a first pre-existing access control list; and receiving a verification from the user of the plurality of entries in the access control list.

14. The non-transitory computer-readable medium of claim 13, wherein the trained transformer model is updated after the verification from the user.

15. The non-transitory computer-readable medium of claim 13, further wherein the method further comprises modifying the predictive engine based on the verification from the user, and wherein:

when the user indicates that an entry in the access control list is a wrong entry produces negative points;

when the user indicates that an entry in the access control list is a correct entry produces positive points;

when the user indicates a missing entry in the access control list produces negative points; and when an entry is unchanged by the user in the access control list produces a cumulative score over a time period time.

16. The non-transitory computer-readable medium of claim 13, the method further comprising:

accessing data comprising user profiles, document content, file metadata, and access control lists;

generating numerical vectors from the user profiles, the document content, the file metadata, and the access control lists;

providing the numerical vectors for the user profiles, the document content, and the file metadata as an input embedding to the trained transformer model, and providing the numerical vectors for the access control lists as an output embedding to the trained transformer model, to produce output probabilities corresponding to generated access control lists; and verifying the generated access control lists to train the trained transformer model.

17. The non-transitory computer-readable medium of claim 13, wherein the content comprises text data.

18. The non-transitory computer-readable medium of claim 13, wherein the access control list is a discretionary access control list (DACL).

* * * * *